(12) United States Patent
Keum et al.

(10) Patent No.: US 10,328,970 B2
(45) Date of Patent: Jun. 25, 2019

(54) APPARATUS AND METHOD FOR CONTROLLING MOTOR OUTPUT

(71) Applicant: MANDO CORPORATION, Gyeonggi-do (KR)

(72) Inventors: Ki Sub Keum, Gyeonggi-do (KR); SeongJoo Kim, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 15/897,146

(22) Filed: Feb. 14, 2018

(65) Prior Publication Data
US 2018/0237055 A1  Aug. 23, 2018

(30) Foreign Application Priority Data
Feb. 17, 2017 (KR) .......................... 10-2017-0021735

(51) Int. Cl.
| | |
|---|---|
| H02H 7/08 | (2006.01) |
| B62D 5/04 | (2006.01) |
| B60R 21/015 | (2006.01) |
| B62D 6/10 | (2006.01) |
| F16H 61/32 | (2006.01) |
| H02P 29/024 | (2016.01) |
| H02P 29/028 | (2016.01) |
| H02K 1/00 | (2006.01) |
| B60R 21/01 | (2006.01) |

(52) U.S. Cl.
CPC ........ *B62D 5/049* (2013.01); *B60R 21/01532* (2014.10); *B62D 5/0487* (2013.01); *B62D 6/10* (2013.01); *F16H 61/32* (2013.01); *H02K 1/00* (2013.01); *H02P 29/024* (2013.01); *H02P 29/028* (2013.01); *B60R 2021/01197* (2013.01)

(58) Field of Classification Search
CPC .......................... B62D 5/049; B60R 21/01532
USPC ...................................... 318/400.21
See application file for complete search history.

(56) References Cited

U.S. PATENT DOCUMENTS

| | | | |
|---|---|---|---|
| 2013/0220727 A1* | 8/2013 | Suzuki ................. | B62D 5/0403 180/443 |
| 2013/0234635 A1* | 9/2013 | Kojima ..................... | H02P 6/12 318/400.21 |
| 2014/0054103 A1* | 2/2014 | Kezobo ................ | B62D 5/0487 180/446 |
| 2016/0200355 A1* | 7/2016 | Mori ..................... | B62D 5/0484 180/446 |

(Continued)

*Primary Examiner* — Erick D Glass
(74) *Attorney, Agent, or Firm* — Ladas & Parry, LLP (57) ABSTRACT

A motor output control apparatus includes: an output detector configured to comprise a first detector for detecting a first output signal generated from a first winding of a motor and a second detector for detecting a second output signal generated from a second winding of the motor; a failure determiner configured to determine whether the first winding or the second winding has a failure based on at least one of the first output signal and the second output signal and based on an input-steering torque; and an output controller configured to determine whether or not an output-calculation value corresponding to the input-steering torque is less than a threshold value if it is determined that the first winding or the second winding has a failure, and configured to control an output of the normal one of the first winding or the second winding according to the determination result.

17 Claims, 7 Drawing Sheets

(56) References Cited

U.S. PATENT DOCUMENTS

2017/0237377 A1* 8/2017 Furukawa ............ B62D 5/0463
                                                    318/564
2018/0354549 A1* 12/2018 Tsubaki ................... B62D 5/04
2019/0023315 A1* 1/2019 Takizawa ............. B62D 5/0484

* cited by examiner

APPARATUS AND METHOD FOR CONTROLLING MOTOR OUTPUT

CROSS REFERENCE TO RELATED APPLICATION

This application claims priority from Korean Patent Application No. 10-2017-0021735, filed on Feb. 17, 2017, which is hereby incorporated by reference for all purposes as if fully set forth herein.

BACKGROUND OF THE INVENTION

1. Field of the Invention

The present embodiments relate to an apparatus and a method for controlling a current output of a double-winding motor when the motor malfunctions.

2. Description of the Prior Art

Electric power steering (EPS) is a system in which a motor driven by electric energy provides auxiliary steering power when a steering wheel rotates to generate torque. That is, a steering force of the steering wheel is appropriately adjusted, depending on a driving speed of a vehicle, by means of electronic control using the motor such that the steering force is reduced while parking the vehicle or driving the same at a low speed, and the steering force is increased while driving the vehicle at a high speed, thereby ensuring a high-speed driving stability.

Most functions performed in the electric power steering are controlled by an electronic control unit (ECU).

However, a short circuit may occur in the windings inside the motor due to manufacturing defects, heat resulting from high power consumption, cumulative vibration, or the like. In addition to the occurrence of the short circuit, a failure may occur in the windings due to various causes such as deterioration of the motor, occurrence of sparks, or the like. If a failure occurs in the windings of the motor due to the above-described causes, motor circuits or the electronic control unit (ECU) may be frequently damaged.

SUMMARY OF THE INVENTION

In order to solve the above problems, the present embodiments provide an apparatus and a method for controlling a motor output when a failure occurs in the motor.

In addition, the present embodiments provide a motor output control apparatus and method for maintaining the output performance of a motor even if a motor failure occurs.

The tasks to be attained by the present embodiments are not limited to the above mentions, and other tasks, which have not been mentioned above, can be clearly understood by those skilled in the art from the following description.

In order to attain the tasks above, a motor output control apparatus, according to the present embodiments, may include: an output detector configured to include a first detector for detecting a first output signal generated from a first winding of a motor and a second detector for detecting a second output signal generated from a second winding of the motor; a failure determiner configured to determine whether the first winding or the second winding has a failure based on at least one of the first output signal and the second output signal and based on an input-steering torque; and an output controller configured to determine whether or not an output-calculation value corresponding to the input-steering torque is less than a threshold value if it is determined that the first winding or the second winding has a failure, and configured to control an output of the normal one of the first winding or the second winding according to the determination result.

In order to attain the tasks above, a motor output control method, according to the present embodiments, may include: an output detection step including a first detection step of detecting a first output signal generated from a first winding of the motor and a second detection step of detecting a second output signal generated from a second winding of the motor; a failure determination step of determining whether the first winding or the second winding has a failure based on at least one of the first output signal and the second output signal and based on an input-steering torque; and an output control step of determining whether or not an output-calculation value corresponding to the input-steering torque is less than a threshold value if it is determined that the first winding or the second winding has a failure and of controlling an output of the normal one of the first winding or the second winding according to the determination result.

As described above, according to the present embodiments, when a failure occurs in the double-winding coil constituting a motor, it is possible to control an output current of the motor, thereby improving the driving stability.

In addition, even if a motor malfunctions, the output performance of the motor can be maintained, thereby reducing the heterogeneity in steering control, which is caused by a failure.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Hereinafter, various embodiments will be described in detail with reference to the accompanying drawings. The advantages and features of the present disclosure and methods of achieving the same will be apparent by referring to embodiments of the present disclosure as described below in detail in conjunction with the accompanying drawings. However, the present disclosure is not limited to the embodiments set forth below, but may be implemented in various different forms. The following embodiments are provided only to completely disclose the present disclosure and inform those skilled in the art of the scope of the present disclosure, and the present disclosure is defined only by the scope of the appended claims. Throughout the specification, the same or like reference numerals designate the same or like elements.

While the terms "first", "second", and the like may modify various elements, components, and/or sections, it will be apparent that such elements, components, and/or sections are not limited by the above terms. The above terms are used merely for the purpose of distinguishing an element, component, or section from other elements, components, or sections. Accordingly, it will be apparent that a first element, a first component, or a first section as mentioned below may be a second element, a second component, or a second section within the technical spirit of the present disclosure.

The terms as used herein are merely for the purpose of describing embodiments and are not intended to limit the present disclosure. As used herein, singular forms are intended to include plural forms unless the context clearly indicates otherwise. The terms "comprises" and/or "comprising" as used herein refer to the existence of a disclosed component, step, operation, and/or element, and do not exclude the existence of or a possibility of addition of one or more other components, steps, operations, and/or elements.

Hereinafter, the present embodiments will be described in more detail with reference to the accompanying drawings.

Figure 2:
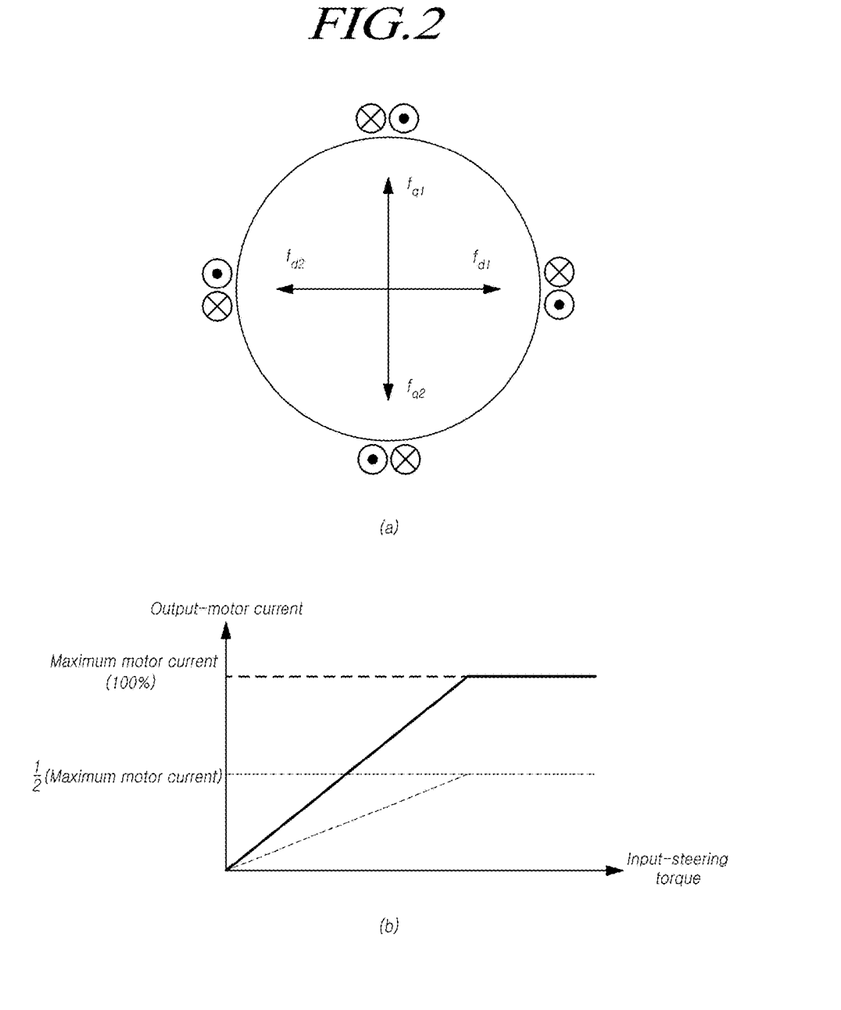
FIG. 2 is a diagram for explaining the operation of a motor output control apparatus when a double-winding motor is in a normal state according to the present embodiments.

FIG. 2 is a diagram for explaining the operation of a motor output control apparatus when a double-winding motor is in a normal state according to the present embodiments. FIG. 2A is a diagram briefly illustrating a double-winding motor, and FIG. 2B is a graph showing an output-motor current according to an input-steering torque, which describes an output operation of the motor in a normal operation.

Generally, an auxiliary power mechanism of an electric power steering (EPS) system is configured to include a torque sensor for sensing a torque applied to a steering wheel by a driver of the vehicle and outputting an electric signal proportional to the sensed torque, an electronic control unit (ECU) for generating a control signal based on an electric signal transmitted from the torque sensor, a motor for generating auxiliary power based on a control signal transmitted from the electronic control unit, and a belt type power transmission device for transferring the auxiliary power generated by the motor to a rack bar via a belt.

However, a short circuit, which is generated in windings inside the motor due to manufacturing defects, heat generated by high power consumption, cumulative vibration, or the like, causes overcurrent, thereby frequently damaging a motor circuit or an electronic control unit (ECU). In addition, a failure of the windings in the motor may be caused by various reasons, such as deterioration of the motor, occurrence of sparks, or the like, as well as the short circuit.

To this end, a motor output control apparatus, according to the present embodiments, uses a double-winding motor that adopts two windings inserted into a single slot, and can control the operation of a motor separately for each winding.

As shown in FIG. 2A, windings of a double-winding motor include an auxiliary winding of a d-phase and a main winding of a q-phase, which have a phase difference of 90 degrees from each other. More specifically, the windings include d1 and d2 windings and q1 and q2 windings because a pair of currents are applied, in opposite directions, to the respective d and q-phase windings.

As shown in the graph of FIG. 2B, each of the d and q-phase windings constituting the double-winding motor outputs 50% of the total output. Accordingly, when the double-winding motor is in a normal operation state, a motor current corresponding to an input-steering torque may be output 100%.

As shown in the drawing, if a current motor output is 100% in a system in which the maximum output in a first winding (or the maximum motor current in a first winding) is 50%, the maximum output in a second winding (or the maximum motor current in a second winding) is 50%, and the total maximum motor output (or the total maximum motor current) is 100%, the first winding and second winding may generate an output of 50%, respectively.

In addition, if a current motor output is 100% in a system in which the maximum output in a first winding (or the maximum motor current in a first winding) is 100%, the maximum output in a second winding (or the maximum motor current in a second winding) is 100%, and the total maximum motor output (or the total maximum motor current) is 200%, the first winding and second winding may generate an output of 50%, respectively. That is, when the motor is in a normal operation state, the current motor output corresponds to a half (½) of the total maximum motor output.

Figure 3:
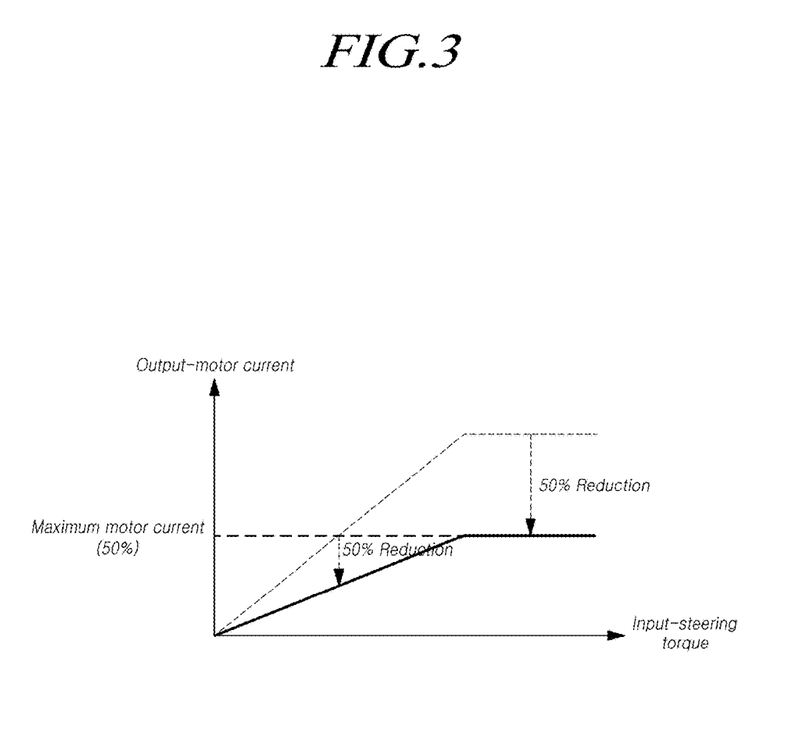
FIG. 3 is a diagram for explaining the operation of a motor output control apparatus when one of two windings in a double-winding motor malfunctions according to the present embodiments.

FIG. 3 is a diagram for explaining the operation of a motor output control apparatus when one of two windings of a double-winding motor malfunctions according to the present embodiments.

Referring to a graph of an output-motor current depending on an input-steering torque shown in FIG. 3, even if a failure occurs in one of two windings in a double-winding motor, a motor output control apparatus, according to the present embodiments, enables the electric power steering system (or the double-winding motor) to normally operate by allowing a normal winding to generate 50% of a total output.

However, in this case, since the double-winding motor outputs only 50% of the total output, it may not be possible to output 100% of the total auxiliary steering power depending on an input-steering torque.

Figure 1:
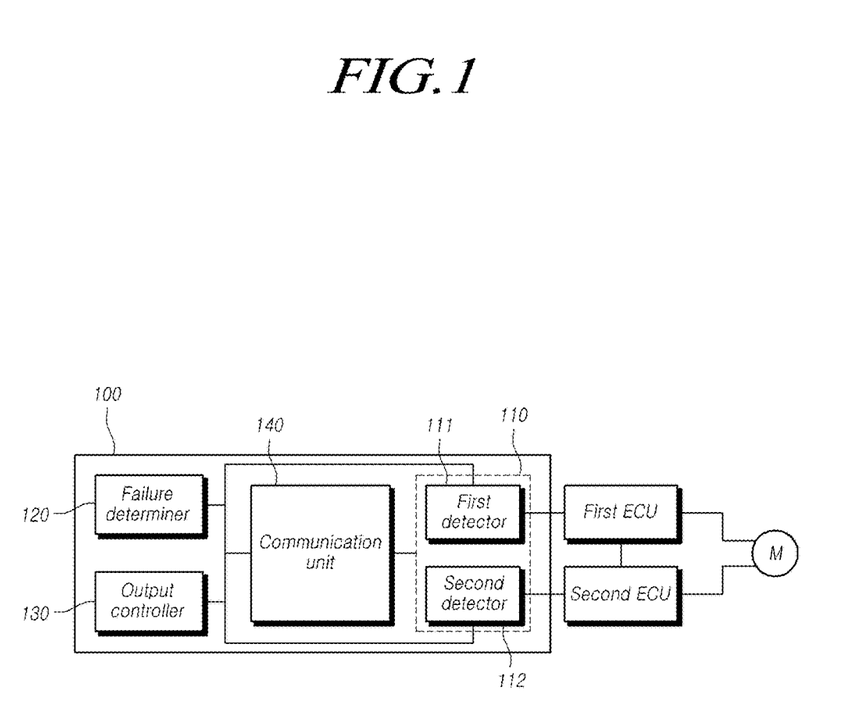
FIG. 1 is a block diagram of a motor output control apparatus according to the present embodiments.

FIG. 1 is a block diagram of a motor output control apparatus according to the present embodiments.

Referring to FIG. 1, a motor output control apparatus 100, according to the present embodiments, includes: an output detector 110 having a first detector 111 for detecting a first output signal generated from a first winding of a motor M and a second detector 112 for detecting a second output signal generated from a second winding of the motor M; a failure determiner 120 for determining whether the first winding or the second winding has a failure based on at least one of the first output signal and the second output signal and based on an input-steering torque; and an output controller 130 for determining whether or not an output-calculation value corresponding to the input-steering torque is less than a threshold value if it is determined that the first winding or the second winding has a failure and for controlling an output of the normal one of the first winding or the second winding according to the determination result.

The motor output control apparatus 100 may further include a communication unit 140 for receiving the first output signal and the second output signal from the first detector 111 and second detector 112, respectively, in the output detector 110 and for receiving the input-steering torque from a steering system.

More specifically, the communication unit 140 may include, as wireless communication schemes provided in a vehicle, a Wireless LAN (WLAN), Wi-Fi, Wireless Broadband (Wibro), World Interoperability for Microwave Access (WIMAX), High Speed Downlink Packet Access (HSDPA), IEEE 802.16, Long Term Evolution (LTE), Wireless Mobile Broadband Service (WMBS), and the like. The communication unit 140 may further include Bluetooth, Radio Frequency Identification (RFID), Infrared Data Association (IrDA), Ultra-Wideband (UWB), ZigBee, CAN communication, automotive Ethernet, Flex-Ray, Local Interconnect Network (LIN), and the like.

The output detector 110 may detect a failure using general methods. That is, the output detector 110 may detect a winding failure of the motor M by sensing a steering angle, a torque, a current, or the like, and may transmit the same to the failure determiner 120 through communication in the vehicle (i.e., the communication unit 140).

That is, the first detector 111 of the output detector 110 may be attached to a first ECU connected to the first winding of the motor M, and may detect a first output signal, such as a steering angle, a torque, a current, or the like, output from the first ECU. In addition, the second detector 112 of the output detector 110 may be attached to a second ECU connected to the second winding of the motor M, and may detect a second output signal, such as a steering angle, a torque, a current, or the like, output from the second ECU.

The failure determiner 120 may receive, through the communication unit 140, information on steering angles, torques, or currents of the first ECU and the second ECU, which are detected by the output detector 110, and may then determine a normal or failure state of the first winding or the second winding.

For example, when the output detector 110 detects that a current applied to the first ECU or the second ECU (i.e., the first output signal or the second output signal) is a half of a current value corresponding to the input-steering torque, the failure determiner 120 may determine that the first ECU or the second ECU (i.e., the first winding or the second winding) is normal.

The input-steering torque refers to a torque applied to a steering wheel by a driver.

The failure determiner 120 may receive the detected information from the output detector 110 via the communication unit 140, and may determine a failure of the first winding or the second winding using typical motor failure determination methods.

In addition, the output controller 130 may receive the result determined by the failure determiner 120, and may generate a control signal for controlling the first output signal or the second output signal of the motor M.

That is, when an output-calculation value corresponding to the input-steering torque is less than a threshold value, the output controller 130 may generate a control signal such that the normal one of the first winding or the second winding outputs the output-calculation value corresponding to the input-steering torque. On the other hand, when an output-calculation value corresponding to the input-steering torque is equal to or greater than the threshold value, the output controller 130 may generate a control signal such that the normal one of the first winding or the second winding outputs the maximum output value.

The output-calculation value corresponding to the input-steering torque may be a current value calculated from an electric signal proportional to the input-steering torque. In addition, the maximum output value may be a maximum current value, which can be output from each of the first winding and the second winding. However, the maximum output value is not limited to the current value, and may be a steering force, a steering torque value, or a parameter value corresponding to the input-steering torque.

Similarly, the threshold value may be a maximum current value, which can be output from each of the first winding and the second winding. However, the threshold value is not limited to the current value, and may be a steering force, a steering torque value, or a parameter value corresponding to the output-calculation value.

Preferably, the maximum output value may be equal to the threshold value, but the threshold value is not limited thereto because it may be changed by means of a user setting according to the output state of the motor M.

The communication unit 140 may receive the control signal generated by the output controller 130, and may transmit the same to the first winding or the second winding (i.e., the first ECU or the second ECU).

The control signal may include a failure flag, which is failure information on the first winding or the second winding. That is, the output of the first winding or the second winding may be shared with each other by transmitting the failure flag to the first ECU or the second ECU.

When the first ECU or the second ECU of the motor M receives the control signal, the normal one of the first winding or the second winding may output a current according to the control signal.

Figure 4:
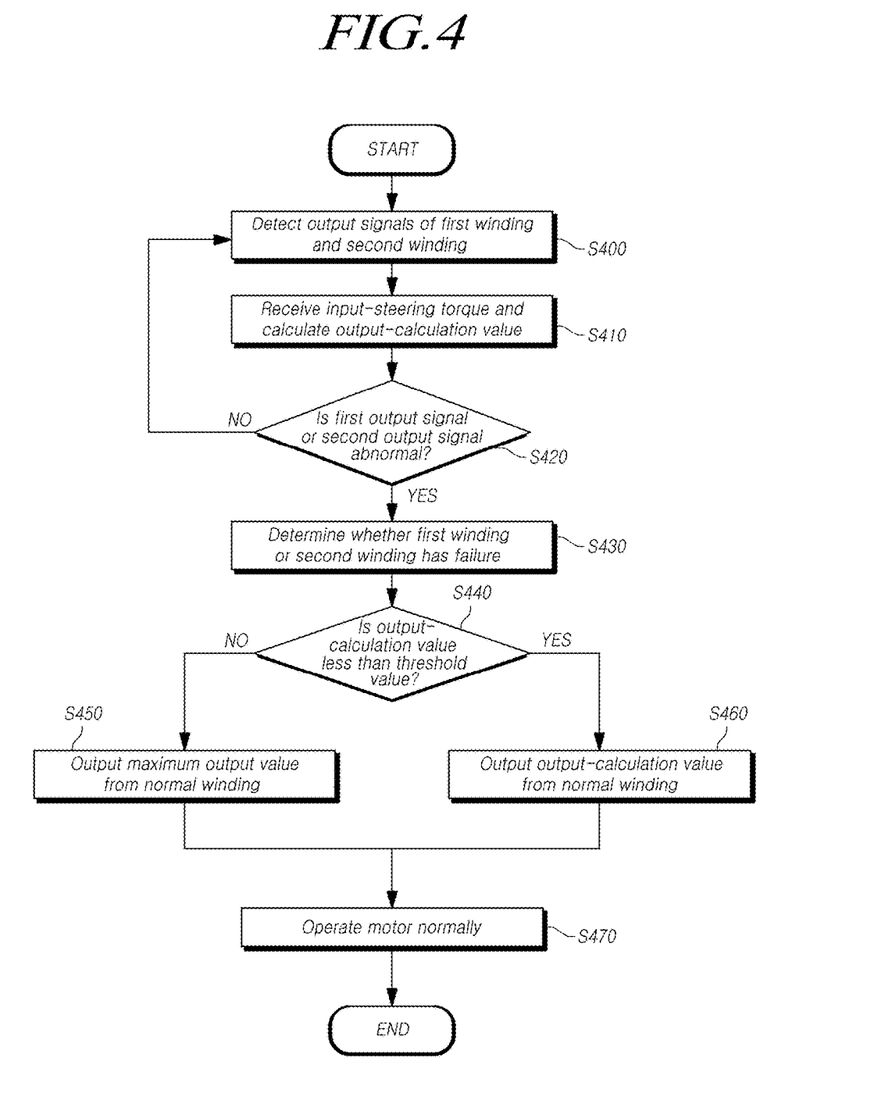
FIG. 4 is a flowchart illustrating a motor output control method according to the present embodiments.

Hereinafter, a motor output control method, according to the present embodiments, will be described with reference to the accompanying drawing (FIG. 4). Particularly, a description of the motor output control apparatus, which has been made above with reference to FIG. 1 according to the present embodiments, will be omitted below for simplicity of explanation.

A motor output control method, according to the present embodiments, may be performed by the motor output control apparatus 100, according to the present embodiments, including the output detector 110 adopting the first detector 111 and the second detector 112, the failure determiner 120, the output controller 130, and the communication unit 140.

FIG. 4 is a flowchart illustrating a motor output control method according to the present embodiments.

A motor output control method, according to the present embodiments, includes: an output detection step including a first detection step of detecting a first output signal generated from a first winding of a motor and a second detection step of detecting a second output signal generated from a second winding of the motor; a failure determination step of determining whether the first winding or the second winding has a failure based on at least one of the first output signal and the second output signal and based on an input-steering torque; and an output control step of determining whether or not an output-calculation value corresponding to the input-steering torque is less than a threshold value if it is determined that the first winding or the second winding has a failure and of controlling an output of the normal one of the first winding or the second winding according to the determination result.

Referring to FIG. 4, the first output signal generated from the first winding of the motor is detected in the first detection step, and the second output signal generated from the second winding of the motor is detected in the second detection step (S400).

The first output signal and the second output signal may be, for example, steering angles, torques, currents, or the like.

Next, in the failure determination step, the input-steering torque is received from the steering system and the output-calculation value corresponding to the input-steering torque is calculated (S410).

The input-steering torque refers to a torque applied to a steering wheel by a driver, and the output-calculation value corresponding to the input-steering torque denotes a value calculated from an electric signal proportional to the input-steering torque.

Then, it is determined whether or not the first output signal or the second output signal is normal based on the output-calculation value corresponding to the input-steering torque (S420). If the first output signal and the second output signal are normal, the first output signal and the second output signal are detected again (S400).

In other words, if it is detected that the first output signal or the second output signal is a half of the output-calculation value corresponding to the input-steering torque, it is determined that the first winding or the second winding is normal.

On the other hand, if it is determined that the first output signal or the second output signal is abnormal, it is determined whether the first winding or the second winding has a failure (S430).

Then, it is determined whether or not the output-calculation value corresponding to the input-steering torque is less than a threshold value (S440). For example, the output-calculation value corresponding to the input-steering torque may be a current value calculated from an electric signal proportional to the input-steering torque. The threshold value may be a maximum current value, which can be output from each of the first winding or the second winding.

If the output-calculation value corresponding to the input-steering torque is equal to or greater than the threshold value, in the output control step, a control signal is generated such that the normal one of the first winding or the second winding outputs the maximum output value, and the control signal is transmitted to the normal winding, thereby outputting the maximum output value (S450).

If the output-calculation value corresponding to the input-steering torque is less than the threshold value, in the output control step, a control signal is generated such that the normal one of the first winding or the second winding outputs the output-calculation value corresponding to the input-steering torque, and the control signal is transmitted to the normal winding, thereby outputting the output-calculation value corresponding to the input-steering torque (S460).

The maximum output value is the maximum current value, which can be output from each of the first winding or the second winding.

Therefore, even if one of the windings in the double-winding motor has a failure, the motor can operate normally (S470).

As described above, when a failure occurs in the double-winding coil constituting a motor, the motor output control apparatus 100, according to the present embodiments, can control an output current of the motor, thereby improving the driving stability. In addition, even if a motor failure occurs, the output performance of the motor can be maintained, thereby reducing the heterogeneity in steering control, which is caused by a failure.

Figure 5:
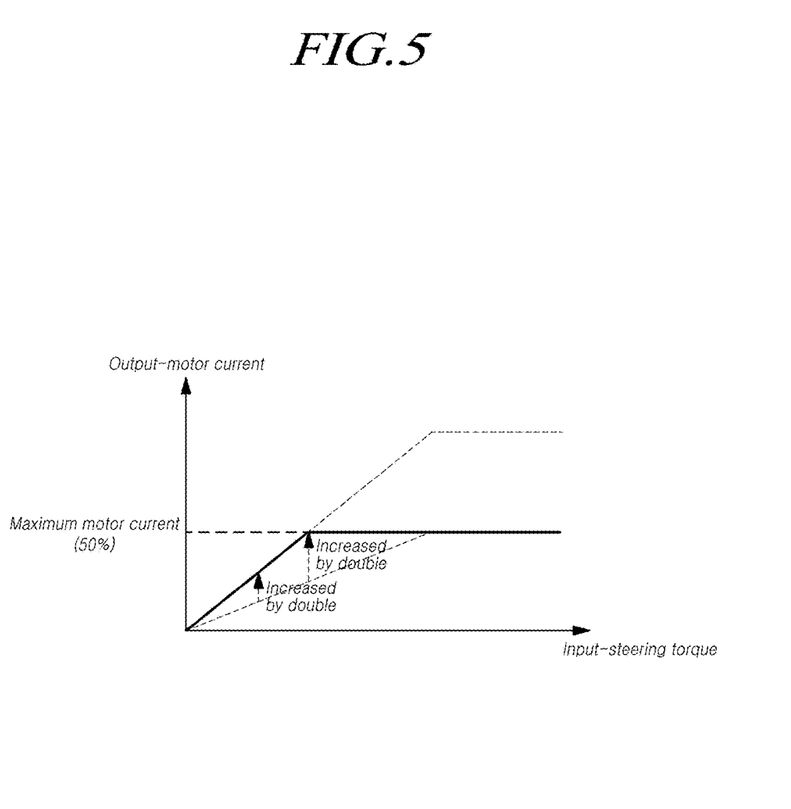
FIG. 5 is a diagram for explaining the operation of a motor output control apparatus when one of two windings of a double-winding motor malfunctions according to the present embodiments.

FIG. 5 is a diagram for explaining the operation of a motor output control apparatus when one of two windings in a double-winding motor has a failure according to the present embodiments.

Referring to a graph for an output-motor current according to an input-steering torque shown in FIG. 5, if an output-calculation value corresponding to the input-steering torque is less than a threshold value (that is, the maximum current value, which can be output from each of the first winding and the second winding), the normal one of the first winding or the second winding may output the total output-calculation value corresponding to the input-steering torque. On the other hand, if an output-calculation value corresponding to the input-steering torque is equal to or greater than the threshold value, the normal one of the first winding or the second winding may output only the maximum output value.

The output-calculation value corresponding to the input-steering torque may be a current value calculated from an electric signal proportional to the input-steering torque. In addition, the maximum output value may be a maximum current value, which can be output from each of the first winding and the second winding. However, the maximum output value is not limited to the current value, and may be a steering force, a steering torque value, or a parameter value corresponding to the input-steering torque.

Similarly, the threshold value may be a maximum current value, which can be output from each of the first winding and the second winding. However, the threshold value is not limited to the current value, and may be a steering force, a steering torque value, or a parameter value corresponding to the output-calculation value.

Preferably, the maximum output value may be equal to the threshold value, but the threshold value is not limited thereto because it may be changed by means of a user setting according to the output state of the motor M.

Therefore, when the output-calculation value corresponding to the input-steering torque is less than the threshold value as shown in FIG. 5, even if a failure occurs in one of the windings, the motor can output auxiliary steering power of 100% according to the input-steering torque.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

As shown in the drawing, if a current motor output is less than the maximum output (50%) of each winding while the first winding malfunctions in a system in which the maximum output in the first winding (or the maximum motor current in the first winding) is 50%, the maximum output in the second winding (or the maximum motor current in the second winding) is 50%, and the total maximum motor output (or the total maximum motor current) is 100%, the motor output may be maintained at 100% by doubling the current output (50%) of the second winding. In addition, if a current motor output is equal to or greater than the maximum output (50%) of each winding while the first winding malfunctions, the current output of the second winding may be maintained at the maximum output (50%) of each winding.

Further, if the first winding malfunctions in a system in which the maximum output in the first winding (or the maximum motor current in the first winding) is 100%, the maximum output in the second winding (or the maximum motor current in the second winding) is 100%, and the total maximum motor output (or the total maximum motor current) is 200%, the motor output may be maintained at 100% by doubling the current output (50%) of the second winding.

As described above, when a failure occurs in one of two windings included in a motor, the motor output control apparatus according to the present embodiments can drive the motor by allowing the other to generate the maximum output.

Figure 6:
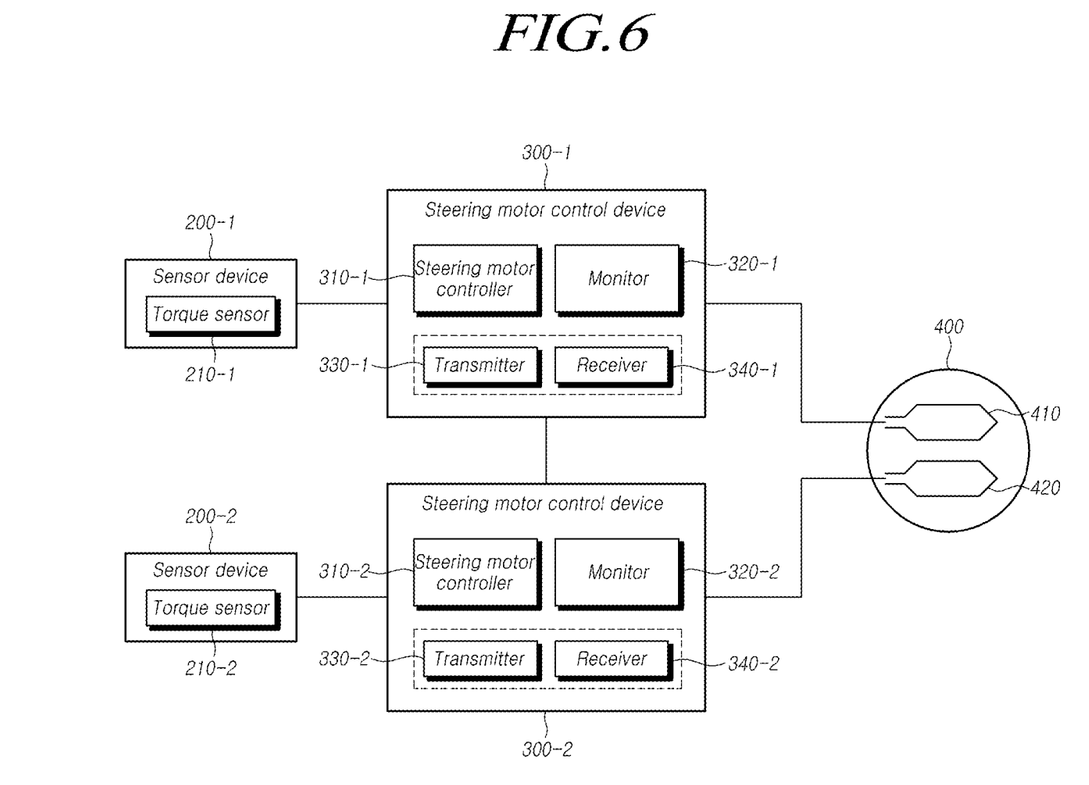
FIG. 6 is a block diagram for explaining a steering motor control system of a vehicle according to the present embodiments.

FIG. 6 is a block diagram for explaining a steering motor control system of a vehicle according to the present embodiments.

Referring to FIG. 6, a steering motor control system for a vehicle, according to the present embodiments, may be configured to include a plurality of sensor devices 200-1 and 200-2, a plurality of steering motor control devices 300-1 and 300-2, and a steering motor 400. Since the steering motor control devices 300-1 and 300-2 may execute the functions performed by the motor output control apparatus 100 and the ECUs (the first ECU and the second ECU) described above with reference to FIG. 1, the duplicate description thereof will be omitted for simplicity of explanation.

The sensor devices 200-1 and 200-2 may include torque sensors 201-1 and 210-2, respectively. The respective torque sensors 210-1 and 210-2 may measure a torque of a steering wheel to thus generate input-steering torque information.

The steering motor control devices 300-1 and 300-2 may receive input-steering torque information from the sensor devices 200-1 and 200-2, respectively. The plurality of steering motor control devices may include first and second steering motor control devices 300-1 and 300-2. Since the first and second steering motor control devices 300-1 and 300-2 perform the same function, the following description will be made of only the first steering motor control device 300-1 for simplicity of explanation.

The first steering motor control device 300-1 may be configured to include a steering motor controller 310-1, a monitor 320-1, a transmitter 330-1, and a receiver 340-1. Since the steering motor controller 310-1 may execute the functions performed by the failure determiner 120, the output controller 130, and the ECU (the first ECU) described above with reference to FIG. 1, the monitor 320-1 may execute the functions performed by the output detector 110 described above with reference to FIG. 1, and the transmitter 330-1 and the receiver 340-1 may execute the functions performed by the communication unit 140 described above with reference to FIG. 1, the duplicate description thereof will be omitted for simplicity of explanation.

The steering motor controller 310-1 may be connected to a first winding 410 of the steering motor 400 including a first winding 410 and a second winding 420, and may provide, to the first winding 410 of the steering motor 400, a first assist current among a first assist current and a second assist current, which are generated based on the input-steering torque information, thereby controlling the steering motor 400. The steering motor controller 310-1 may be configured to include an ECU, a power converter, and the like. The ECU may generate a control signal based on the input-steering torque information, and the power converter may generate the first assist current based on the control signal to thus provide the same to the first winding of the steering motor. The power converter may include at least one of a converter and an inverter.

The monitor 320-1 may monitor at least one state of the steering motor 400 or the steering motor controller 310-1.

When the steering motor 400 and the steering motor controller 310-1 are in an abnormal state, the transmitter 330-1 may transmit first failure indication information (for example, a failure flag) to the other steering motor control device (e.g., the second steering motor control device 300-2).

The receiver 340-1 may receive second failure indication information (a failure flag) from the other steering motor control device (e.g., the second steering motor control device 300-2).

When the second failure indication information is received, the steering motor controller 310-1 may adjust the first assist current to thus provide the same to the first winding 410, thereby controlling the steering motor 400 based on the same.

For example, when the second failure indication information is received, the steering motor controller 310-1 may adjust (or increase) the first assist current to a value not exceeding the maximum output (or current) of the first winding 410, thereby controlling the steering motor 400. Here, the reception of the second failure indication information may be understood as the second steering motor control device 300-2 has a failure.

That is, when the second failure indication information is received, the steering motor controller 310-1 may increase the first assist current to a value of the first assist current and the second assist current generated based on the input-steering torque information (for example, doubling the first assist current), thereby controlling the steering motor 400. Even in this case, the first assist current may be increased within a range not exceeding the maximum output (or current) of the first winding 410. That is, when the increased first assist current exceeds the maximum output (or current) of the first winding 410, the maximum output of the first winding 410 may be maintained.

Here, the output-calculation value corresponding to the input-steering torque described with reference to FIG. 1 may be the first assist current and the second assist current generated based on input-steering torque information, and the threshold value may be the maximum output (or current) of the first winding.

When the second failure indication information is received, if the first assist current and the second assist current, which are generated based on the input-steering torque information, are less than the maximum output (or current) of the first winding 410, the steering motor controller 310-1 may provide a current corresponding to the first assist current and the second assist current, which are generated based on the input-steering torque information, to the first winding, thereby controlling the steering motor 400.

In addition, when the second failure indication information is received, if the first assist current and the second assist current, which are generated based on the input-steering torque information, are equal to or greater than the maximum output (or current) of the first winding 410, the steering motor controller 310-1 may provide a current corresponding to the maximum output (or current) of the first winding 410 to the first winding, thereby controlling the steering motor 400.

The steering motor 400 may include a double-winding motor having a first winding and a second winding.

Figure 7:
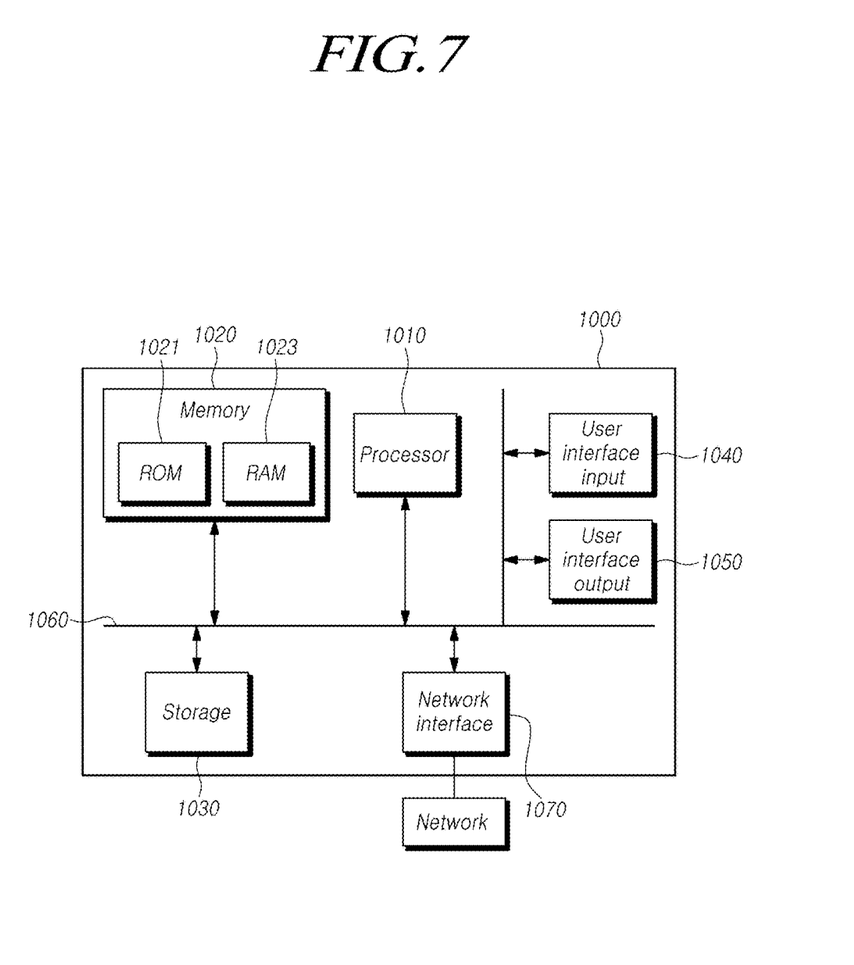
FIG. 7 is a block diagram of a computer system in a motor output control apparatus and a steering motor control system of a vehicle according to the present embodiments.

FIG. 7 is a block diagram of a computer system in a motor output control apparatus and a steering motor control system of a vehicle according to the present embodiments.

Referring to FIG. 7, the above-described embodiments may be implemented by means of, for example, a computer-readable recording medium in a computer system. As shown in the drawing, a computer system 1000 of a motor output control apparatus, a vehicle steering motor control system, or the like, may include at least one of one or more processors 1010, a memory 1020, a storage 1030, a user interface input 1040, and a user interface output 1050, which communicate with one another via a bus 1060. The computer system 1000 may further include a network interface 1070 for access to a network. The processor 1010 may be a CPU or a semiconductor device that executes processing instructions stored in the memory 1020 and/or the storage 1030. The memory 1020 and the storage 1030 may include various types of volatile/non-volatile storage media. For example, the memory may include a ROM 1021 and a RAM 1023.

Accordingly, the present embodiments may be implemented by means of a non-volatile computer-readable recording medium storing a method executed by a computer or computer-executable instructions. The instructions may perform the method according to the present embodiments when executed by the processor.

The above embodiments have been described merely for the purpose of illustrating the technical idea of the present disclosure, and those skilled in the art will appreciate that various modifications and changes are possible without departing from the scope and spirit of the present disclosure. The scope of the present disclosure shall be construed on the basis of the accompanying claims in such a manner that all of the technical ideas included within the scope equivalent to the claims belong to the present disclosure.

What is claimed is:

1. A motor output control apparatus comprising:
   a first detector detecting a first output signal generated from a first winding of a motor and a second detector detecting a second output signal generated from a second winding of the motor;
   a failure determiner configured to determine whether the first winding or the second winding has a failure by comparing at least one of the first output signal and the second output signal with an input-steering torque applied to a steering wheel; and
   an output controller configured to determine whether or not an output-calculation value corresponding to the input-steering torque is less than a threshold value when the first winding or the second winding has the failure, and configured to control an output of the normal one of the first winding or the second winding according to the determination result.

2. The apparatus of claim 1, further comprising a communication unit configured to receive the first output signal and the second output signal from the first and second detectors, and configured to receive the input-steering torque from a steering system.

3. The apparatus of claim 2, wherein if the output-calculation value corresponding to the input-steering torque is less than the threshold value, the output controller is configured to generate a control signal such that the normal one of the first winding or the second winding outputs the output-calculation value corresponding to the input-steering torque.

4. The apparatus of claim 1, wherein if the output-calculation value corresponding to the input-steering torque is equal to or greater than the threshold value, the output controller is configured to generate a control signal such that the normal one of the first winding or the second winding outputs the maximum output value.

5. The apparatus of claim 4, wherein the maximum output value is a maximum current value, which can be output from each of the first winding and the second winding.

6. The apparatus of claim 3, wherein the communication unit is configured to receive the control signal from the output controller and to transmit the same to the first winding or the second winding.

7. The apparatus of claim 3, wherein the control signal comprises a failure flag, which is failure information on the first winding or the second winding.

8. A motor output control method comprising:
   detecting a first output signal generated from a first winding of a motor and detecting a second output signal generated from a second winding of the motor;
   determining whether the first winding or the second winding has a failure based on at least one of the first output signal and the second output signal and based on an input-steering torque; and
   determining whether or not an output-calculation value corresponding to the input-steering torque is less than a threshold value when the first winding or the second winding has the failure and controlling an output of the normal one of the first winding or the second winding according to the determination result.

9. The method of claim 8, wherein the determining whether or not an output-calculation value corresponding to the input-steering torque is less than a threshold value comprises, if the output-calculation value corresponding to the input-steering torque is less than the threshold value, generating a control signal such that the normal one of the first winding or the second winding outputs the output-calculation value corresponding to the input-steering torque.

10. The method of claim 8, wherein the determining whether or not an output-calculation value corresponding to the input-steering torque is less than a threshold value comprises, if the output-calculation value corresponding to the input-steering torque is equal to or greater than the threshold value, generating a control signal such that the normal one of the first winding or the second winding outputs the maximum output value.

11. The method of claim 8, further comprising receiving the first output signal and the second output signal from at least one detector, and receiving the input-steering torque from a steering system.

12. The method of claim 10, wherein the maximum output value is a maximum current value, which can be output from each of the first winding and the second winding.

13. The apparatus of claim 1, wherein the output-calculation valve corresponding to the input-steering torque is a current value calculated from an electric signal proportional to the input-steering torque.

14. The method of claim 8, wherein the output-calculation valve corresponding to the input-steering torque is a current value calculated from an electric signal proportional to the input-steering torque.

15. The apparatus of claim 1, wherein the failure determiner is configured to determine whether the first winding or the second winding has the failure by detecting whether the first output signal or the second output signal is a half of the output-calculation valve corresponding to the input-steering torque.

16. The method of claim 8, wherein the determining whether the first winding or the second winding has the failure comprises comparing the at least one of the first output signal and the second output signal with the input-steering torque.

17. The method of claim 16, wherein the comparing the at least one of the first output signal and the second output signal with the input-steering torque comprises detecting whether the first output signal or the second output signal is a half of the output-calculation valve corresponding to the input-steering torque.

* * * * *